Sept. 2, 1941.   E. W. CARROLL   2,254,595
APPARATUS FOR ORIENTATING FRUITS HAVING A LONG AXIS
Filed Aug. 9, 1939   3 Sheets-Sheet 1
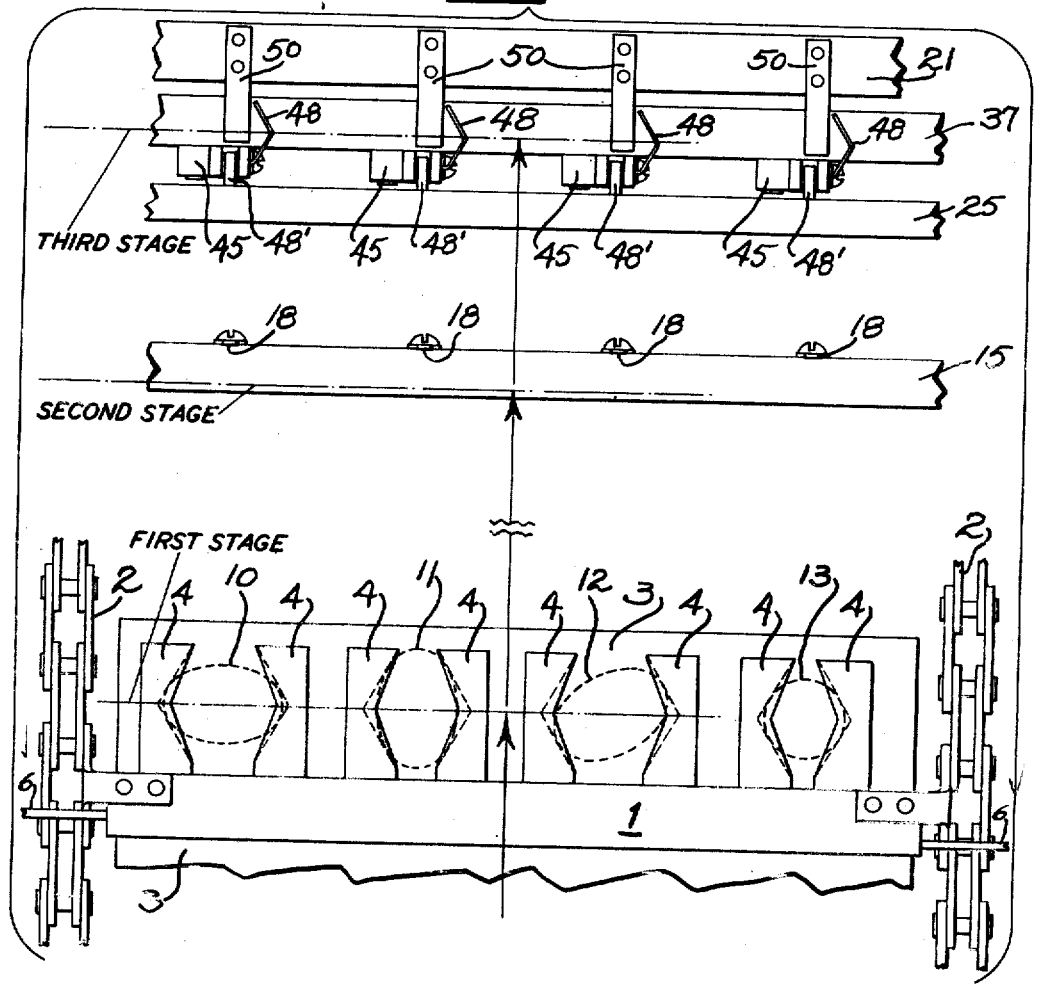
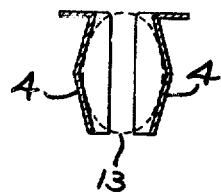
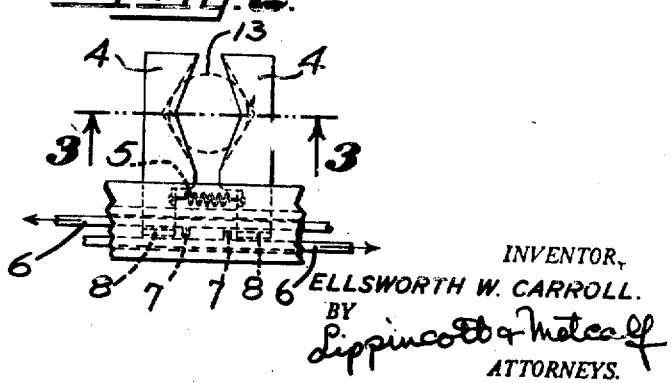
INVENTOR,
ELLSWORTH W. CARROLL.
BY
Lippincott & Metcalf
ATTORNEYS.

Sept. 2, 1941.  E. W. CARROLL  2,254,595
APPARATUS FOR ORIENTATING FRUITS HAVING A LONG AXIS
Filed Aug. 9, 1939  3 Sheets-Sheet 2
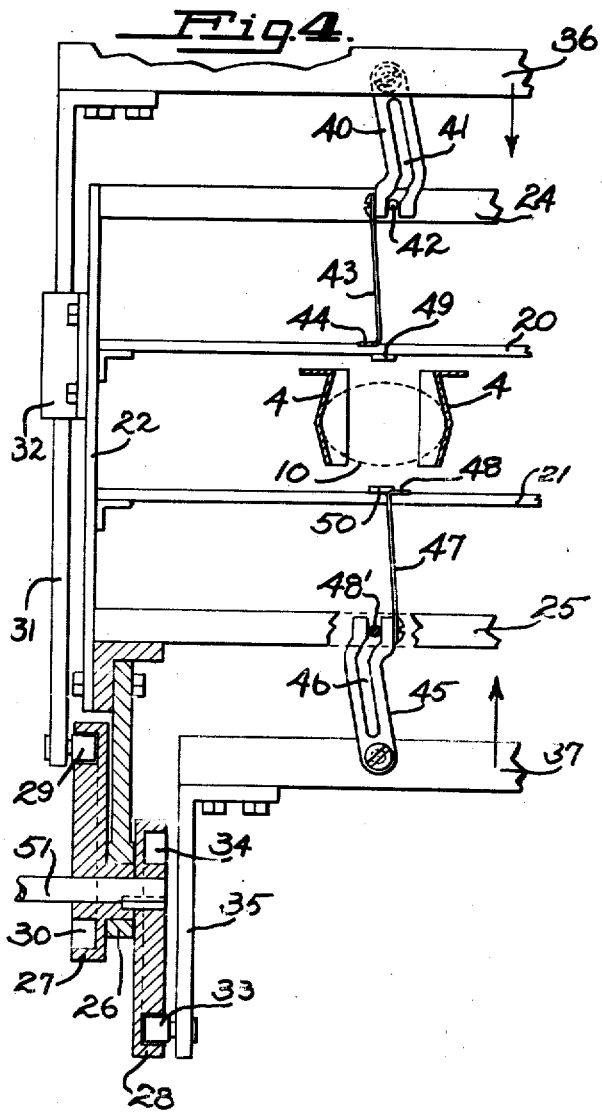
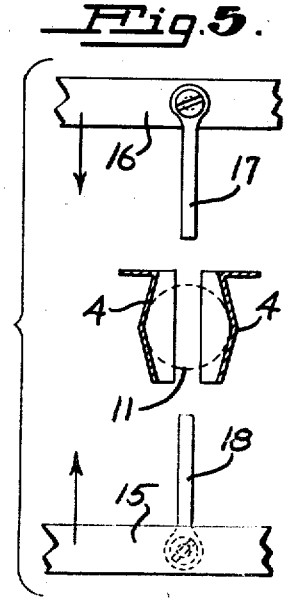
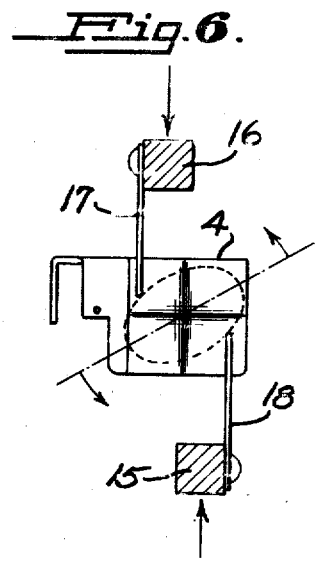
INVENTOR,
ELLSWORTH W. CARROLL.
BY
*Lippincott & Metcalf*
ATTORNEYS.

Sept. 2, 1941. E. W. CARROLL 2,254,595
APPARATUS FOR ORIENTATING FRUITS HAVING A LONG AXIS
Filed Aug. 9, 1939 3 Sheets-Sheet 3
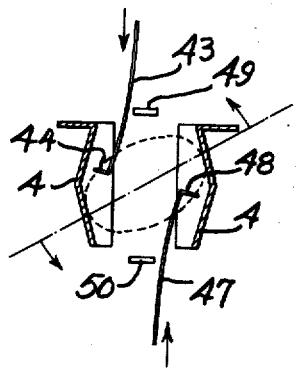
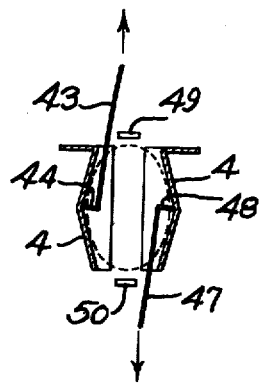
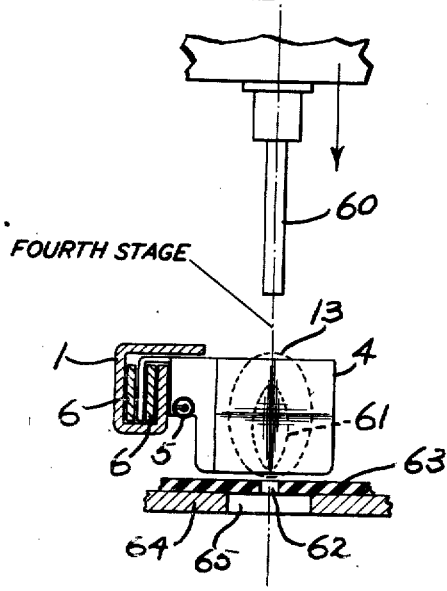
INVENTOR.
ELLSWORTH W. CARROLL.
BY
*Lippincott & Metcalf*
ATTORNEYS.

Patented Sept. 2, 1941

2,254,595

UNITED STATES PATENT OFFICE 2,254,595

APPARATUS FOR ORIENTATING FRUITS HAVING A LONG AXIS

Ellsworth W. Carroll, San Francisco, Calif., assignor to S & W Fine Foods, Inc., San Francisco, Calif., a corporation of California Application August 9, 1939, Serial No. 289,113

7 Claims. (Cl. 198—33)

My invention relates to a method and apparatus for orientating fruit, and more particularly to such a method and apparatus adapted to orientate ellipsoidal fruit having one axis thereof materially longer than any other axis. Such a fruit is well exemplified as to shape by an olive.

It is well known in the fruit packing art that many fruits command premium prices if they are orientated before being pitted so that the pit is extracted along a line corresponding with a predetermined axis of the fruit.

Usually the axis utilized for pitting orientated fruits is an axis passing through the pit or stone of the fruit and through the stem end. In many cases the stem end is provided with an indent or dimple which can be utilized to position the fruit beneath a pitting knife, because the dimpled edges provide a support by which the fruit may be held in a vertical position with the stem indent down, thus providing a generally vertical path through the pit or stone and the stem indent for a pitting knife.

At the present time practically all fruits pitted along an axis definitely related to the fruit contour are positioned in a pitter by hand with the stem indent down so that a vertical pitting knife will enter the end of the fruit opposite the stem indent and push the pit out of the fruit through the stem indent area. A fruit which may be handled in this manner and pitted through the stem indent is typified by the cherry. But even with a more or less symmetrical fruit such as the cherry, the contour of the stem indent region varies so greatly that in many cases it is impossible to maintain the fruit with the dimple down, so that the axis which passes through the dimple, the pit, and the end opposite the dimple, is vertical. If it is not vertical the pitting knife will miss a percentage of pits and a careful inspection of the output of the fruit is necessary.

There are fruits, moreover, which do not have stem indents of sufficient size to support the fruit beneath the pitting knife, and there are also fruits which have a longitudinal axis which is materially greater in length than any lateral axis. In other words, in fruits similar to the olive the stem indent is small and the length of the fruit is materially greater than its maximum width. Under these circumstances the fruit will not support itself with the long axis in the vertical position beneath the pitting knife and some resort must be had, even with hand feeding, to fixed lateral support while the pitting operation is occurring. Even with such lateral support, however, all fruits are not held with the long axis of the fruit vertical, or as is imperative, in substantial alinement with the axis of the pitting tool, as the fruit will tilt in the supporting means. Furthermore, hand feeding and hand orientation is slow, and the output of a hand fed pitting machine is always low. Thus, fruit pitted through a definite axis has heretofore been much higher in cost than fruit which is pitted along heterogeneous axes.

With fruits such as the olive, however, another factor enters the problem. The olive pit is not substantially round, but is elongated in general conformity with the elongation of the fruit. Thus, unless the olive is positioned beneath a pitting machine with the long axis of both fruit and pit substantially coextensive with the axis of the pitting knife, the fruit will not be properly pitted, and even minor variations from the vertical will cause the knife to miss the pit entirely as the point of the pit will fall outside of the advancing edge of the pitting knife.

The objects of the present invention are several, and my invention is broadly directed to full automatic orientation with relation to the long axis of a fruit, and without reliance on the dimple.

First, I provide a means and method of orientating fruits having a long axis, such as an olive, without any hand feeding whatsoever. I receive fruits in heterogeneous positions and automatically deliver them in a predetermined position with relation to the long axis of the fruit so that they may be properly pitted along this axis. I also eliminate any necessity for hand orientation.

Another object of my invention is to provide a means and method of automatically turning fruit so that the long axis thereof will be in a position to coincide with the axis of a pitting knife during pitting.

Still another object of my invention is to provide a means and method of holding a fruit having a long axis, and turning it, while being held, to a new position, to the end that the fruit is always maintained in a position retaining the benefit of the directed turning movement.

I also provide a means and method of applying a turning moment to a fruit which is being held in an undesired position and of preventing the application of a turning moment to fruit which by chance happens to be in a desired position.

In practicing my method, I utilize a machine in which a full automatic orientator is incorporated, which will positively orientate and hold for pitting along the long axis thereof, or for other purposes, fruit such as an olive.

Referring to the drawings:

Fig. 1 is a diagrammatic fragmentary plan view of three stages of a full automatic olive orientating machine embodying my invention, the majority of driving mechanisms being omitted to insure clarity of illustration of my method. The lower halves only of the second and third stages are shown.

Fig. 2 is a top plan view of one fruit clamp.

Fig. 3 is a sectional view taken as indicated by the line 3—3 in Fig. 2.

Fig. 4 is a vertical sectional view taken through the third stage of the machine shown in Fig. 1, both upper and lower halves being shown.

Fig. 5 is a view partly in section and partly in elevation, taken through the second stage of the machine shown in Fig. 1, both halves being shown.

Fig. 6 is a view partly in elevation and partly in section, showing the operation of the second stage.

Fig. 7 is a fragmentary view partly in section and partly in elevation, showing the operation of the third stage.

Fig. 8 is a view similar to Fig. 7, showing the fruit orientated to the pitting position.

Fig. 9 is a view partly in elevation and partly in section, of the fourth or pitting stage.

My invention may be best understood by direct reference to the drawings and the following description thereof.

In Fig. 1, the first three stages of fruit orientating machine operation are shown, corresponding to three manipulative steps, included in a preferred embodiment of my invention.

The incidental machinery necessary to give movement to the parts has not been shown, inasmuch as such mechanical movements are well known in the art, and can be easily supplied by anyone skilled in the art, in accordance with the demands of the following description of the operation of the device. The direction of motion of the moving parts is indicated by arrows in the drawing.

A conveyor bar 1 is attached at each end to conveyor chains 2—2, preferably moving intermittently over a horizontal plane. In a high speed production machine a number of such bars would normally be attached to chains 2 conveying the plurality of bars sequentially over stationary base plate 3. Conveyor bar 1 is hollow and carries on the leading edge thereof a plurality of fruit clamps, each comprising opposed and laterally movable clamp arms 4. Within the bar, as shown in Fig. 2, the clamp arms are urged together by clamp spring 5 and are positively pulled apart by clamp opening rods 6—6 movable in opposite directions to open each clamp by engagement of bar pins 7 with clamp arm lugs 8. Such motion may easily be imparted to rods 6 by a cam as chains 2 advance. Thus, clamp arms 4 may be opened to a predetermined distance but may approach each other varying distances as determined by any obstruction, such as fruit, between them. Clamp arms 4 are angularly concave both in the horizontal plane and the vertical plane, as shown in Figs. 2 and 3, and thus will clamp and hold a long axis fruit, such as an olive, in any position received when the long axes of the fruits are normal or nearly normal to opposed surfaces. The general contour of the concavities is such as to roughly fit an olive or similar fruit having a long axis, with the long axis vertical, as shown in Fig. 3.

As conveyor bar 1 moves over stationary base plate 3, all of the clamps are opened by movement of rods 6 as above explained, and the chain momentarily stops. Fruits such as olives are then fed from a hopper into the space between the open arms 4. The next movement of chains 2 and bar 1 releases all the clamps to clasp the fruit. This can be accomplished by actuating rods 6. Obviously the fruit in each clamp will be held in various positions by the action of clamp spring 5 and positions are shown by the dotted lines between clamp arms in Fig. 1, as determined by the normality of the long axes of the fruits to the clamp arm walls at points of contact therewith. In this figure, I have shown four separate clamps wherein the left hand clamp is holding an olive 10 with its long axis horizontal and parallel to conveyor bar 1. In the next clamp is held olive 11 with its long axis horizontal but at right angles to the axis of olive 10. The next clamp holds olive 12 in an angular relation to the clamp arms, and the right hand clamp holds olive 13 in vertical position.

The olives in the four separate clamps as finally held, are not necessarily in the same position as fed to the open clamps, because when the clamps are released to close down upon the fruit delivered to them, the fruits may turn, due to the angular relationship of the clamp walls to the surface of the fruits, and the urge of the clamp spring, to a stable position. Obviously all the fruits illustrated in Fig. 1 are in stable positions, and if reference be made to fruit 12 it will be seen that while it only makes two point contact with the clamp, the long axis of the fruit is substantially normal to the clamp surfaces, thus being held in a stable position under the urge of the clamp spring. The amount of automatic orientation that takes place immediately the clamps are released to close upon the fruit is due to slippage of the fruit within the clamp, and this slippage is greatly enhanced by the fact that most fruits fed through a machine, such as the machine herein described, are fed directly from a pickling or preserving brine. This brine acts as a lubricant facilitating the turning of the fruit to a stable position within the clamp when spring pressure is exerted.

Chains 2 and conveyor bar 1 then progress to and stop at the second stage which comprises stationary cross bars 15 and 16, one positioned below the fruit clamps and the other positioned above the fruit clamps as shown in Fig. 5. Cross bar 16 carries a stiff turning pin 17 extending downwardly therefrom, and cross bar 15 carries a similar turning pin 18 extending upwardly therefrom.

The action of this second stage is to turn any fruit whose long axis is horizontal and roughly at right angles to carrier bar 1, but not to disturb any fruit whose long axis is vertical, or horizontal and roughly parallel to conveyor bar 1.

Pins 17 and 18 are alined with the space between clamp arms 4, but do not enter the space between the clamp arms when the conveyor is moving. Cross bars 15 and 16, however, are given a reciprocating motion toward each other after the clamps have stopped in position, so that on the stroke toward each other both pins 17 and 18 will enter the space between the clamp arms 4. This reciprocating motion may be obtained from cam mechanism similar to that later described in connection with the third stage.

Pins 17 and 18 are offset from each other in the direction of the travel of the fruit, so that if, during their approach, they contact the surface of fruit this contact will be made at each side of the center of the fruit. Thus, a fruit having its long axis horizontal and in a position as shown by the fruit 11 in Fig. 1, will be contacted by the pins 17 and 18 on both sides of the center of the long axis and turned within the clamp, as shown in Fig. 6.

Any new position assumed by fruit 11 due to these off-center pushes is immediately held because of the spring tension between the clamp arms, and fruit 11 will therefore be held with its long axis vertical or nearly so. Pins 17 and 18 only need to turn the fruit to a point where the stability of the fruit in the clamp is overcome, and the angularity of the clamp walls will finish the orientation due to the urge of the clamp spring and the shape of the clamp arms forcing a slippage of the fruit into a new stable position after the long axis increases its angle to the clamp walls to the point where slippage can start.

Fruits such as fruit 10 in Fig. 1, which has its long axis horizontal and substantially parallel to conveyor bar 1, will not be changed in position by the action of pins 17 and 18, as any turning movement applied to fruit 10 would merely rotate it on the long axis and would not overcome its stability. In most cases, however, sufficient offset is given to pins 17 and 18 so that the terminals of these pins do not contact fruits in the position of fruit 10 at all. Angularly positioned fruits such as fruit 12 in Fig. 1 may be contacted by pins 17 and 18, and in accordance with the extent of their angularity with relation to bar 1, will either be turned into the horizontal position of fruit 10 or into the vertical position of fruit 13. Thus, all fruit passing through the second stage will leave the second stage with the fruits in one of two positions, namely, in the position of fruit 10 where the long axis is horizontal and parallel to conveyor bar 1, or in the position of fruit 13, with its long axis vertical. After the pins 17 and 18 have acted on the fruit, the conveyor moves the fruit to the third stage.

The function of the third stage is to turn all fruits that are in the position of fruit 10 to a new position where the long axis is vertical. Then all the fruits in all the clamps will be vertical and in position for pitting directly through the vertical axis by a vertically moving pitter knife. It is also important that the means for turning fruits in the horizontal positions of fruit 10, shall not substantially change the position of fruits in the vertical position of fruit 13.

I accomplish this final orientation step by a third stage shown in horizontal plan in Fig. 1 and labeled "Third stage." This third stage is also shown in elevation and section in Fig. 4. Here a stationary frame bar 20 is positioned above the line of clamp passage, and a second stationary frame bar 21 is positioned below the clamp line. Frame bars 20 and 21 are attached to frame 22 which also carries guide pin bars 24 and 25 above and below frame bars 20 and 21, respectively. Frame 22 also carries a bearing 26 in which is journaled an upper cam 27 positioned on one side of the bearing and a connected lower cam 28 on the other side of the bearing. Cam follower 29 operates in the slot 30 in cam 27 and is attached to upper connecting rod 31 reciprocating in rod bearing 32. Cam follower 33 operates in a follower groove 34 in cam 28 and is connected to a lower operating rod 35. Upper operating rod 31 drives vertical upper reciprocating bar 36, and lower operating rod 35 is connected to a lower reciprocating bar 37. Upper reciprocating bar 36 carries a moving orientation cam 40 of curved contour having a curved slot 41 therein to accommodate an upper stationary pin 42 mounted on frame bar 24, and cam 40 also carries a downwardly extending flexible orientation wire 43 having a terminal portion 44 bent in V-shape to roughly correspond to the horizontal contour of the interior surface of one clamp arm 4. Lower reciprocating bar 37 carries a similar cam 45 having a similar slot 46 and a similar orientation wire 47 also provided with a terminal 48 fitting the horizontal contour of opposite clamp arm 4. Pin 48' on lower frame bar 25 enters slot 46. Frame bars 20 and 21 also carry horizontally extending retaining bars 49 and 50 positioned above and below the space through which the clamps pass, and centralized with respect to the space enclosed by the clamp. Cams 27 and 28 are driven in any convenient manner in synchronism with the motion of chains 2 through a shaft 51.

Reciprocation of upper and lower reciprocating bars 36 and 37 causes orientation tips 43 and 47 to approach each other. A similar mechanism can be used to reciprocate pins 17 and 18 in the second stage.

After a clamp containing a fruit in the position of fruit 10 in Fig. 1 is positioned between wires 43 and 47, it will be seen that as the terminals 44 and 48 of the wires 43 and 47, respectively, approach the fruit in the clamp, that due to the contour of slots 41 and 46 in cams 40 and 45, the terminals 44 and 48 of the wires will have a vertical motion toward each other and also an outward, lateral motion. The path of the terminals is guided by the cam slots to be that of the surface of a normal fruit in the vertical position. The terminals 48 and 44 will therefore contact the surface of a horizontal fruit 10 on each side of the center of the long axis, but short of the end of the fruit. As the terminals approach each other further in the vertical movement they push against and turn a horizontally positioned fruit 10 so that the long axis thereof is moved to a vertical position, as shown in Fig. 7. The flexibility of wires 43 and 47 causes maximum pressure to be exerted against the fruit, as the terminals try to follow a path coinciding with the surface of a vertical fruit, but cannot exactly do so because of the length of the horizontal fruit. The wires may therefore become slightly bent, as shown in Fig. 7, and the spring of the wires increases the turning moment.

Inasmuch as the contour of the cam slots 41 and 46 is such that terminals 44 and 48 follow a general path corresponding to the curvature of a vertical fruit, and the curvature of the cam slots is also such that if the clamp arms 4 are at their minimum approach distance, as determined by the position therebetween of a normal olive in the vertical position, the terminals will readily pass between the surface of the vertical fruit and the clamp arm wall and therefore will not exert any turning moment on a vertical fruit. This is shown in Fig. 8. A slight bending of the wires will cause them to exert maximum pressure against the inner wall of arms 4 in this case, not against the fruit surface.

As in the second stage, it is only necessary for the wires 43 and 47 to rotate the fruit a sufficient amount to overcome stability thereof, and the spring of the clamp arms will finish the orientation. Retaining bars 49 and 50 above and below the fruit prevent any total vertical shift of the fruit.

Thus, all fruits which enter the third stage will have, as previously explained, their long axes either vertical, as eventually desired, in which case the action of the third stage will not change their position, or the long axes will be horizontal and generally parallel to the conveyor bars, in which case the push of the orientating wires 43 and 47 will turn the fruit to a vertical position. Thus, all the fruit passing out of the third stage will have their axes vertical after being manipulated in this stage.

Conveyor bars 1 may then carry the clamps with their vertically positioned fruit into a fourth or pitting stage, as shown in Fig. 9. Here, the clamps are stopped with their own vertical axes, and consequently the vertical axes of the clamped fruits in alinement with the axis of a pitting knife 60, which then is movable downwardly to enter the end of the fruit, to pass through the fruit, to push the pit 61 of the fruit through an aperture 62 in a flexible base plate 63 supported on an inflexible base plate 64 cut away with a larger aperture 65 to allow the passage of the pits. Obviously, any satisfactory olive pitting knife and base plate may be utilized in this connection. It should be noted, however, that inasmuch as the fruit is firmly held by the concave walls of the clamp and by the clamp spring pressure, no stripper will generally be needed because the clamp will prevent the fruit from rising with the knife after pitting.

After the fruit has been pitted the conveyor bars may be moved still further, the clamps opened, and the pitted fruit discharged for further utilization, as desired.

From the above description, taken into consideration with the drawings, illustrating one apparatus for performing my method, it can readily be seen that I have provided a full automatic orientator which will turn fruits having a long axis to a position where the long axis coincides with a predetermined line, the desirable line being the line of motion of a pitting knife. Obviously, however, my invention may have utility for the orientation of fruits, even though no pitting step is utilized thereon as in some cases it is desirable to orientate the long axes of fruits in order that the tips be cut off, or for other purposes well known in the art. Consequently, I do not wish to be limited to the use of a pitting step following the fruit orientation.

It will be noted that my novel method of orientating fruit is accomplished without reference to the dimple and without utilization thereof, and consequently, fruit having a long axis can be orientated even though a relatively small, or no dimple at all, is present.

It should also be pointed out that while I have utilized, in my preferred embodiment of my invention, clamp arm walls which, once instability of the fruit has been produced, will finish orientation to a very accurate line, that this final orientation in many cases may not be necessary. Orientation obtained by the positive push alone may well be sufficient to position fruits close enough to a vertical position to insure proper pitting. The final automatic positioning due to the spring urge of the clamp arms after instability has been produced is, however, highly desirable in fruits having an elongated pit. Thus, I wish it to be distinctly understood that I do not wish to be limited to the use of clamp arm walls fitting the general contour of the fruit, inasmuch as positive orientation, without the accuracy of the orientation described above, can be obtained by the use of clamp arms having continuous straight walls.

It should also be distinctly understood that while I have described my invention with relation to certain horizontal and vertical planes, that inasmuch as gravity has no part in the operation of the device, and as the fruits are at all times firmly held in the various positions as determined by the operations thereon, that the terms "horizontal" and "vertical," as utilized in the present description, are purely relative and that any other positions may be utilized without relation to the gravitational plane, and these other positions are considered full equivalents within the scope of the appended claims.

I claim:

1. Apparatus for orientating ellipsoidal fruit comprising a pair of opposed arms having internal surfaces roughly shaped to fit such fruit only when said fruit is positioned therebetween with the long axis of said fruit substantially coaxial with the long axis of the space defined by said surfaces, spring means urging said arms together to grasp a fruit positioned therebetween, a turning pin positioned adjacent one end opening of said clamp arms, a second turning pin positioned adjacent the other end opening of said clamp arms, said pins being positioned on opposite sides of the long axis of said space, and means for simultaneously reciprocating said pins in and out of said space.

2. Apparatus in accordance with claim 1 wherein said reciprocating means move said pins in paths parallel to said space axis.

3. Apparatus in accordance with claim 1 wherein said pins are flexible wires.

4. Apparatus in accordance with claim 1 wherein said pins are flexible wires terminating in a fruit contacting portions bent at right angles to the extent of said wires.

5. Apparatus in accordance with claim 1 wherein said pins are flexible wires terminating in a fruit contacting portions bent at right angles to the extent of said wires and wherein said wires are positioned with said fruit contacting portions adjacent said interior surfaces and reciprocated along a portion of the extent thereof.

6. Apparatus in accordance with claim 1 wherein said pins are flexible wires terminating in a fruit contacting portions bent at right angles to the extent of said wires and wherein said wires are positioned with said fruit contacting portions adjacent said interior surfaces, roughly shaped to fit the contour of said interior surfaces.

7. Apparatus in accordance with claim 1 wherein each of said pins is positioned intermediate the opposed edges of said arms.

ELLSWORTH W. CARROLL.